(12) United States Patent
Viswanathan et al.

(10) Patent No.: US 10,402,522 B1
(45) Date of Patent: Sep. 3, 2019

(54) REGION AWARE CLUSTERING

(71) Applicant: Cadence Design Systems, Inc., San Jose, CA (US)

(72) Inventors: Natarajan Viswanathan, Austin, TX (US); Charles Jay Alpert, Cedar Park, TX (US); Thomas Andrew Newton, Great Cambourne (GB); William Robert Reece, Over (GB)

(73) Assignee: Cadence Design Systems, Inc., San Jose, CA (US)

( * ) Notice: Subject to any disclaimer, the term of this patent is extended or adjusted under 35 U.S.C. 154(b) by 117 days.

(21) Appl. No.: 15/692,637

(22) Filed: Aug. 31, 2017

(51) Int. Cl.
*G06F 17/50* (2006.01)

(52) U.S. Cl.
CPC ........ *G06F 17/5031* (2013.01); *G06F 17/505* (2013.01); *G06F 17/5072* (2013.01); *G06F 17/5077* (2013.01); *G06F 17/5081* (2013.01); *G06F 2217/84* (2013.01)

(58) Field of Classification Search
CPC ............. G06F 17/5072; G06F 17/5077; G06F 17/5081; G06F 17/505; G06F 17/5031; G06F 2217/84
USPC ............... 716/114, 122, 131, 124, 125, 134; 703/16
See application file for complete search history.

(56) References Cited

U.S. PATENT DOCUMENTS

| | | | | |
|---|---|---|---|---|
| 4,275,380 A | * | 6/1981 | Gardner | G06K 7/14 235/456 |
| 6,351,840 B1 | * | 2/2002 | Teng | G06F 1/10 716/122 |
| 2003/0221176 A1 | * | 11/2003 | Andreev | G06F 17/5072 716/125 |
| 2008/0168412 A1 | * | 7/2008 | Cheon | G06F 17/5077 716/114 |
| 2009/0193377 A1 | * | 7/2009 | Puri | G06F 17/5077 716/119 |

* cited by examiner

*Primary Examiner* — Phallaka Kik
(74) *Attorney, Agent, or Firm* — Schwegman Lundberg & Woessner, P.A.

(57) ABSTRACT

Aspects of the present disclosure address improved systems and methods for region-aware clustering in integrated circuit (IC) designs. Consistent with some embodiments, the method may include identifying a clustering region for each clock driver included in an IC design based on locations of sinks and blockages, and timing constraints. The CTS tool finds representative locations for each clock driver within their respective clustering regions. Given the representative location for each clock driver, the CTS tool applies point-based clustering to the clock drivers of the IC design to obtain one or more clusters.

20 Claims, 7 Drawing Sheets

REGION AWARE CLUSTERING

TECHNICAL FIELD

The present disclosure generally relates to the technical field of integrated circuit (IC) design. In particular, the present disclosure addresses systems and methods for designing a clock tree for an IC.

BACKGROUND

An IC layout specifies portions of various components of an IC. When the IC is to include a large number of registers, latches, flip-flops and/or other types of clocked devices ("sinks") that are to be clocked by one or more clocks, the IC must include one or more clock trees for delivering the clock signal from the clock source to all of the sinks to be clocked by it. A clock tree distributes a clock signal from its root to a set of sinks within an IC through a branching network of fan-out buffers. A clock tree includes a hierarchy of fan-out buffers, clock gating elements, and clock logic, collectively referred to as clock drivers (which may or may not invert the clock signal), for fanning the clock tree out from one or more buffers at a top level of the hierarchy to a large number of buffers, or clock gating elements, or clock logic at the lowest level of the hierarchy, that drive the clock inputs of the sinks. Conventional techniques for constructing the branching network of fan-out clock drivers to the sinks assume a single unique location or point for each clock driver. However, these conventional techniques are suboptimal for trunk-level clustering because they lead to increased gate count, gate area, and routing resource usage.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure include software stored on computer-readable media which, when read and executed by a machine, configures the machine to include a clock tree synthesis (CTS) tool. Consistent with some embodiments, the CTS tool performs a region-aware clustering method for IC designs. The method may include identifying a clustering region for each clock driver included in an IC design based on the locations of its driven elements (e.g., sinks, clock drivers, etc.) and blockages, and timing constraints. The CTS tool finds representative locations for each clock driver within their respective clustering regions that can be used in lieu of the clustering regions when employing a location-based or point-based clustering algorithm. Given the representative location for each clock driver, the CTS tool applies point-based clustering to the clock drivers of the IC design to obtain one or more clusters. By considering a clustering region for placing clock drivers rather than conventional methods which assume each clock driver has a single unique location, the CTS tool may achieve an advantage over the conventional methods by lowering clock buffer count, area, and power consumption and improving balance in clock tree structures.

Figure 1:
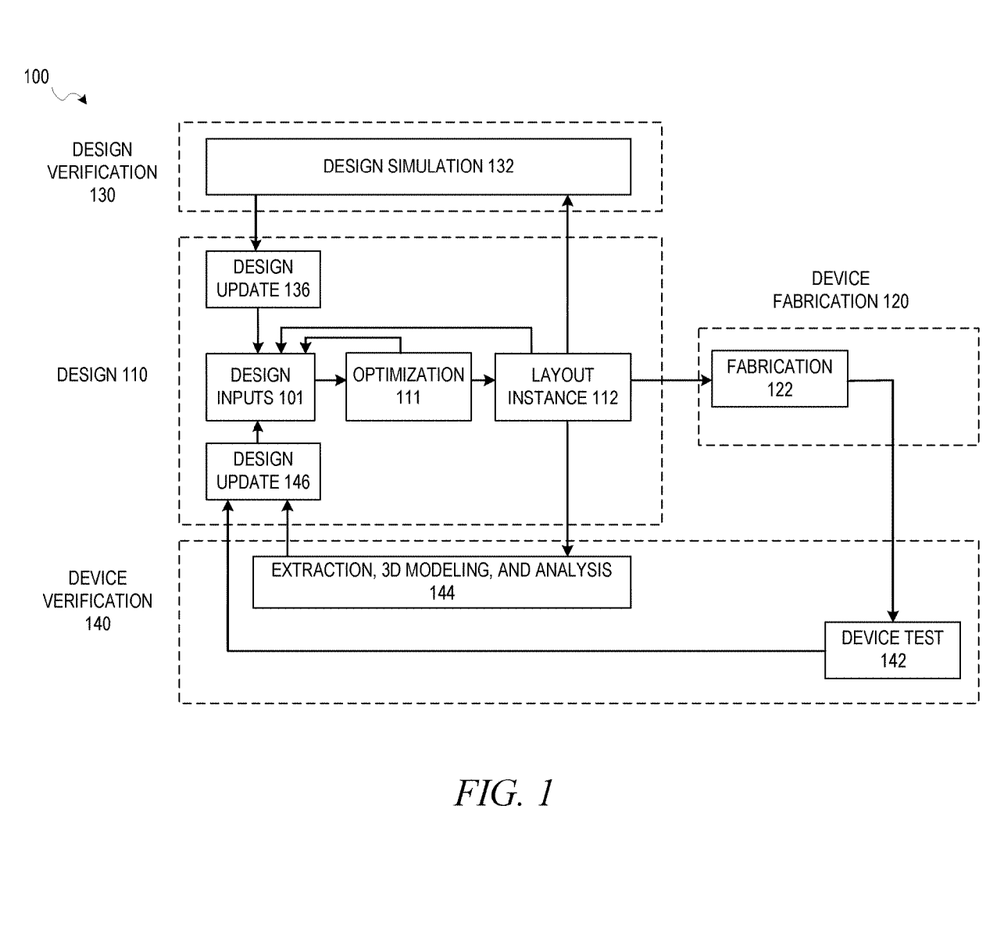
FIG. 1 is a diagram illustrating a possible design process flow which includes elements for region-aware clustering of clock drivers, according to some example embodiments.

FIG. 1 is a diagram illustrating one possible design process flow which includes elements for region-aware clustering of clock drivers, according to some embodiments. It will be apparent that other design flow operations may function using the timing constraints and optimizations described herein, but design flow 100 is described here for the purposes of illustration. As illustrated, the overall design flow 100 includes a design phase 110, a device fabrication phase 120, a design verification phase 130, and a device verification phase 140. The design phase 110 involves an initial design input operation 101 where the basic elements and functionality of a device are determined, as well as revisions based on various analyses and optimization of a circuit design. This design input operation 101 is where a CTS tool generates initial layouts for a clock tree structure and sinks, before refinements are made to ensure that timing requirements for each sink are met. The generation of the initial layouts for the balanced clock tree structure and sinks may include a region-aware clustering solution for grouping the sinks. The initial strategy, tactics, and context for the device to be created are also generated in the design input operation 101, depending on the particular design algorithm to be used.

In some embodiments, following an initial selection of design values in design input operation 101, the CTS tool performs clock tree synthesis and associated timing analysis and optimization (e.g., refinements to clock tree structure) according to various embodiments occurs at optimization operation 111, along with any other automated design processes. Design constraints for a clock tree structure and sinks which receive a clock signal from the clock tree structure may be initiated with design inputs in design input operation 101, and then may be analyzed using timing analysis, according to various embodiments. While design flow 100 shows such optimization occurring prior to layout instance 112, such timing analysis and optimization may be performed at any time to verify operation of a circuit design. For example, in various embodiments, constraints for blocks in a circuit design may be generated prior to routing of connections in a circuit design, after routing, during register transfer level (RTL) operations, or as part of a final signoff optimization or verification prior to a device fabrication operation 122. Certain embodiments of operations described herein for region aware clustering may therefore involve iterations of design input operation 101, optimization operation 111, and layout instance 112 generation. In other systems, other design processes may be used.

After design inputs are used in design input operation 101 to generate a circuit layout, and any optimization operations 111 are performed, a layout is generated in layout instance 112. The layout describes the physical layout dimensions of the device that match the design inputs. This layout may then be used in a device fabrication operation 122 to generate a device, or additional testing and design updates may be performed using designer inputs or automated updates based on the design simulation 132 operations or extraction, 3D modeling, and analysis 144 operations. Once the device is generated, the device can be tested as part of device test 142 operations, and layout modifications generated based on actual device performance.

As described in more detail below, design updates 146 from design simulation 132; design updates 146 from device test 142 or extraction, 3D modeling, and analysis 144 operations; or direct design input operation 101 may occur after an initial layout instance 112 is generated. In various embodiments, whenever design inputs are used to update or change an aspect of a circuit design, a timing analysis and optimization operation 111 may be performed.

Figure 2:
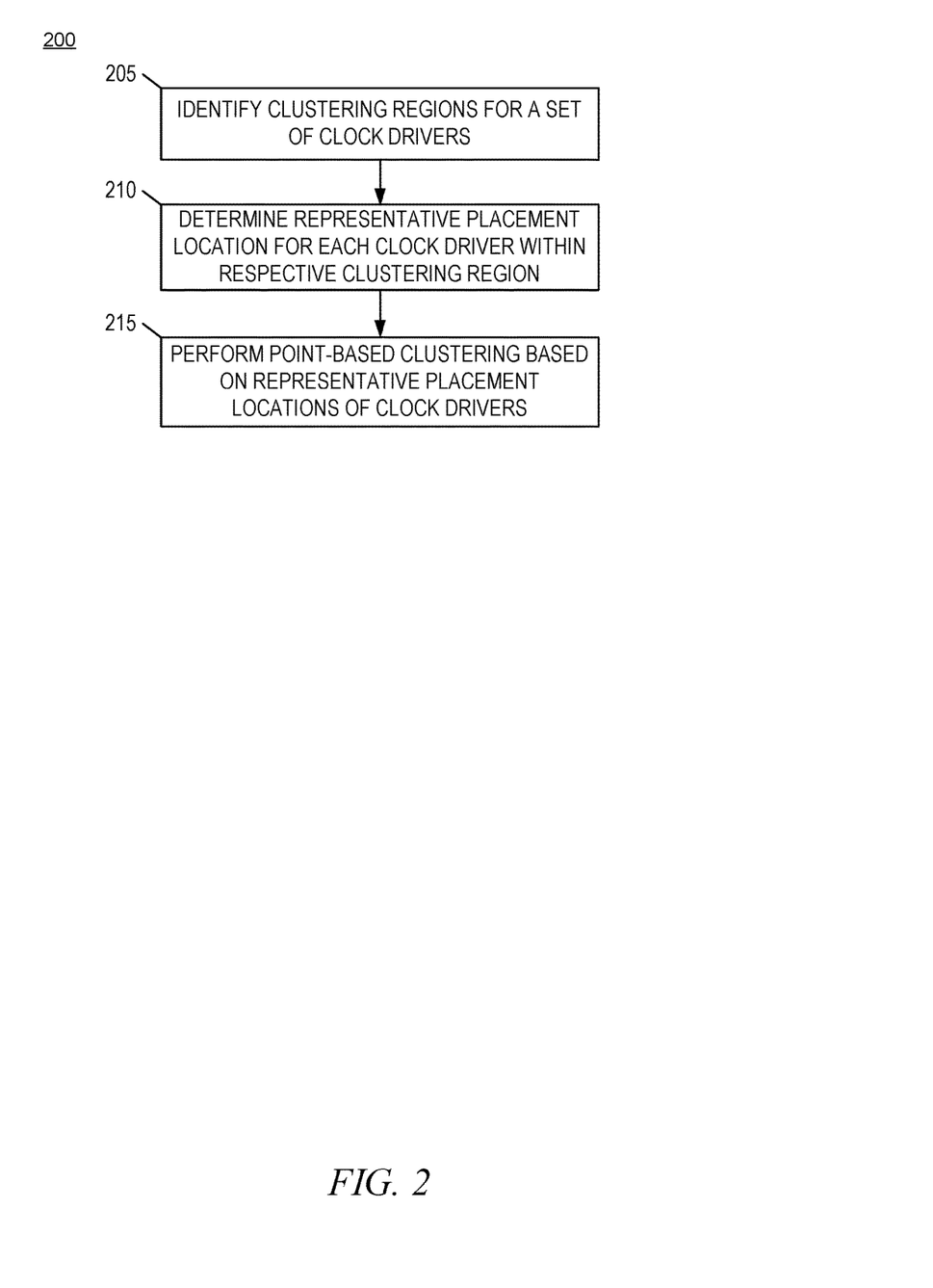
FIGS. 2 and 3 are flowcharts illustrating operations of a CTS tool in performing a method for region-aware clustering of clock drivers, according to some embodiments.

FIG. 2 is a flowchart illustrating operations of a CTS tool in performing a method 200 for region-aware clustering of clock drivers, according to some embodiments. The method 200 may be embodied in computer-readable instructions for execution by one or more processors such that the operations of the method 200 may be performed in part or in whole by a computing device (e.g., machine 500 of FIG. 5). Such an embodiment may include software executed on an electronic design automation (EDA) computing device that includes the CTS tool; accordingly, the method 200 is described below by way of example with reference thereto. However, it shall be appreciated that the performance of method 200 is not intended to be limited to such hardware configurations, and at least some of the operations of the method 300 may be deployed on various other hardware configurations. For example, some embodiments comprise a device that includes a memory with a circuit design, and processing circuitry configured into a special device to perform the operations of method 200.

As shown, at operation 205, the CTS tool identifies clustering regions for a set of clock drivers of an IC design. Each clustering region is specifically associated with a clock driver from the set of clock drivers. The clustering region of a clock driver defines an area within the IC design in which the clock driver may be placed while still satisfying targets derived from one or more timing-based and non-timing-based design rule constraints (e.g., slew, skew, total cluster capacitance, etc.). The clustering region of a given clock driver may be based on locations of the elements being driven by the clock driver (e.g., sinks, clock drivers, etc.), blockages in the IC design, and timing constraints of the IC design. More specifically, a clustering region of a given clock driver may be defined such that: the clustering region encompasses the elements being driven by the clock driver (e.g., sinks, clock drivers, etc.,); avoids blockages; and satisfies timing constraints of the IC design. Accordingly, identifying a clustering region for a given clock driver may include at least one of identifying locations of one or more elements (e.g., sinks, clock drivers, etc.,) being driven by the clock driver, identifying one or more blockages in the IC design, determining one or more timing constraints of the IC design.

Consistent with some embodiments, clustering regions of clock drivers may be previously defined as part of the IC design. In these embodiments, the identifying of the clustering regions may include accessing the previously defined clustering regions from the IC design, for example, from a data store that is included in or communicatively coupled to the CTS tool.

At operation 210, the CTS tool determines a representative location for each clock driver within a respective clustering region. These representative locations can be used in lieu of the clustering region employed in traditional point-based clustering algorithms. In determining the representative locations, the CTS tool may iteratively move the set of clock drivers to find an arrangement for the clock drivers that includes the representative location for each clock driver.

More specifically, to determine the representative locations for the clock drivers, the CTS tool may determine the nearest neighbors for each clock driver with the clock driver placed at an initial location (e.g., at the center of the clustering region) and construct a graph depicting this relationship. In the graph of nearest neighbors, nodes represent clock drivers, and nodes that represent neighboring clock drivers (e.g., clock drivers within a threshold distance from one another) are connected by edges, the length of which corresponds to the distance between clock drivers. Accordingly, the CTS tool may iteratively move the set of clock drivers to find an arrangement for the set of clock drivers that has the shortest total edge length in the graph of nearest neighbors. The total edge length may, for example, be determined by finding the Manhattan distance between nodes. Thus, by minimizing the total edge length of the graph of nearest neighbors, the CTS tool may effectively minimize the total wire length of the graph of nearest neighbors. In minimizing the total edge length of the graph of nearest neighbors, the CTS tool may apply one of many known placement algorithms and techniques for minimizing edge length in a graph (e.g., quadratic placement, linear placement, or optimal region-based detailed placement). Further details regarding the determination of representative locations are discussed below in reference to FIG. 3, according to some example embodiments.

The CTS tool, at operation 215, performs point-based clustering in accordance with the representative locations for the clock drivers. The CTS tool may perform the point-based clustering according to conventional algorithms for point-based clustering (e.g., k-means clustering). For example, in some embodiments, the point-based clustering may include defining a proximity metric based on the representative locations for the clock drivers (e.g., Manhattan distance between the representative locations of the clock drivers) and using the metric to recursively group the clock drivers subject to target loading constraints. More specifically, the CTS tool may recursively group the clock drivers such that the distance between representative locations of any two clock drivers is below a threshold set by the proximity metric. It shall be appreciated that although a specific example of a point-based clustering algorithm has been provided above, the representative locations identified at operation 210 may be used in conjunction with any point-based clustering algorithm and are not limited for use in the example algorithm provided above.

The CTS tool may further perform timing analysis to determine timing characteristics of the clock tree cluster, and may further evaluate the clock tree structure in accordance with one or more timing constraints based on the timing characteristics of the clock tree structure.

Figure 3:
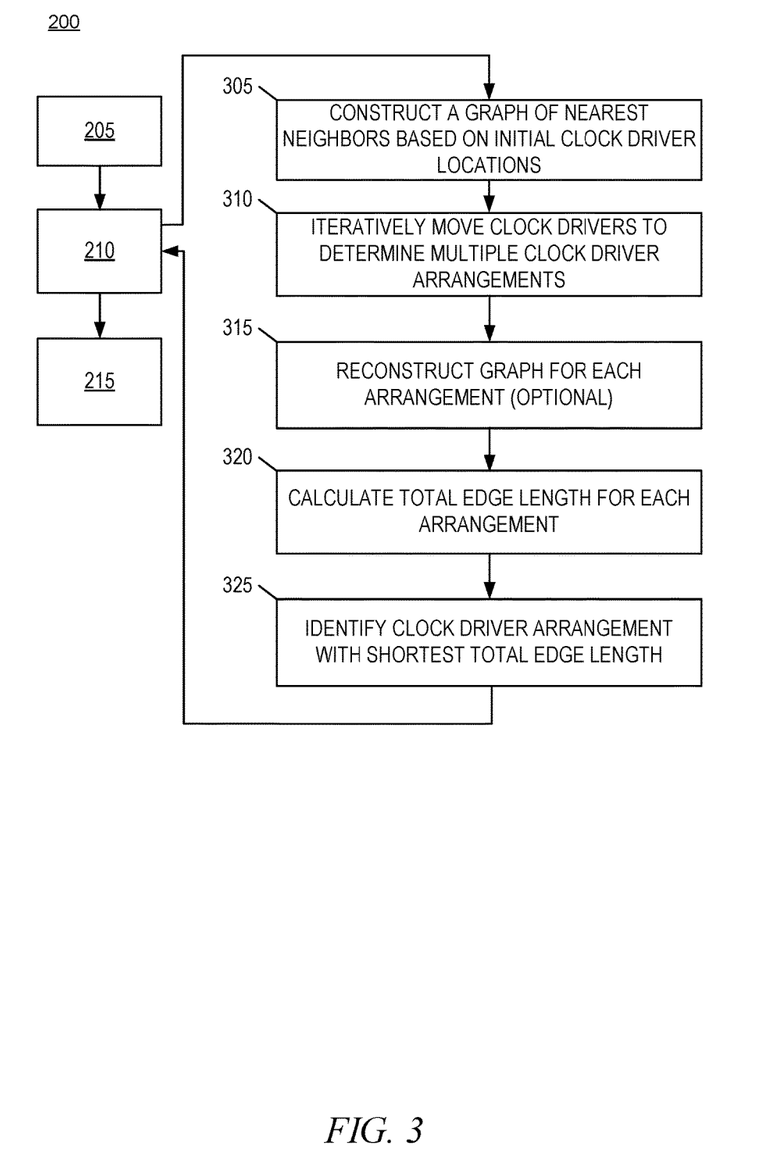

As shown in FIG. 3, the method 200 may, in some embodiments, include operations 305, 310, 315, 320, and

325. Consistent with some embodiments, the operations 305, 310, 315, 320, and 325 may be performed as part of (e.g., a subtask or subroutine) of operation 210, where the CTS tool determines representative locations for each clock driver within their respective clustering regions.

At operation 305, the CTS tool constructs a graph of the nearest neighbors for the set of clock drivers using initial locations for each clock driver. For example, the CTS tool may initially assume each clock driver is located at the center (e.g., centroid) of their respective clustering region. Based on these locations, for a given or selected clock driver, the CTS tool can choose the clock drivers with locations below a predefined threshold distance as the nearest neighbors of the selected clock driver. Once the nearest neighbors for the set of clock drivers have been identified, for each clock driver, the CTS tool constructs an edge between the clock driver and its nearest neighbors, thereby constructing the graph of nearest neighbors. As noted above, in the graph of nearest neighbors, nodes represent clock drivers, and nodes that represent neighboring clock drivers (e.g., clock drivers within a threshold distance from one another) are connected by edges, the length of which corresponds to the distance between clock drivers.

In the alternative, the CTS tool may construct a graph where nodes represent clock drivers and each node is connected to all other nodes in the set of clock drivers by edges, the length of each edge corresponding to the distance between clock drivers. The CTS tool may identify and remove edges that exceed a predetermined threshold distance, and the remaining edges in the graph thereby correspond to the graph of nearest neighbors for the set of clock drivers.

As shown, the CTS tool, at operation 310, iteratively moves the set of clock drivers within respective clustering regions. In this way, the CTS tool creates a new clock driver arrangement at each iteration with the objective of minimizing the total edge length of the graph of nearest neighbors. That is, at each iteration the CTS tool may move the set of clock drivers such that the total edge length is shorter than the previous iteration. In doing so, at each iteration, the CTS tool may reconstruct the graph of nearest neighbors at operation 315, which is optional in some embodiments. At operation 320, the CTS tool calculates the corresponding total edge length of the graph of nearest neighbors. This process may continue until the CTS tool identifies the clock driver arrangement that has the shortest total edge length of all possible clock driver arrangements (at operations 325). In this manner, the CTS tool iteratively moves locations of clock drivers to minimize the total edge length of the corresponding graph of nearest neighbors.

Figure 4A:
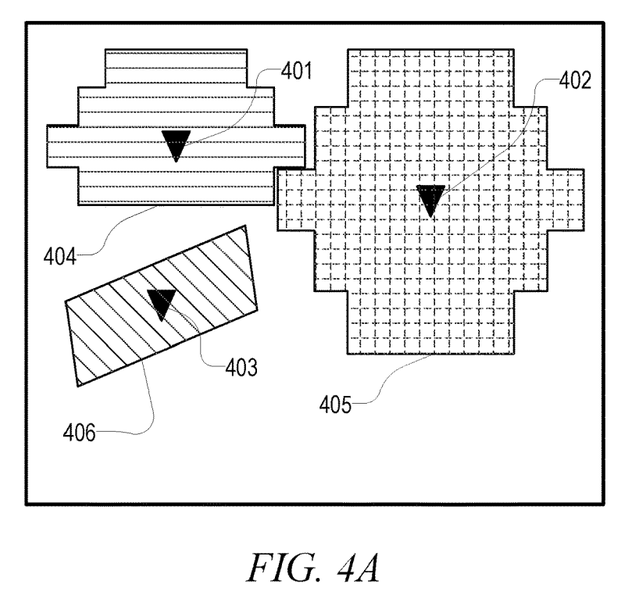
FIGS. 4A-F are conceptual diagrams that graphically illustrate an example application of the method for region-aware clustering, according to some embodiments.

FIGS. 4A-F are conceptual diagrams that graphically illustrate an example application of the method 200 for region-aware clustering, according to an example. Shown in FIG. 4A are a set of clock drivers that comprise clock drivers 401-403, each of which has an associated clustering region. Specifically, clock driver 401 is shown within clustering region 404; clock driver 402 is shown within clustering region 405; and clock driver 403 is shown within clustering region 406.

Figure 4B:
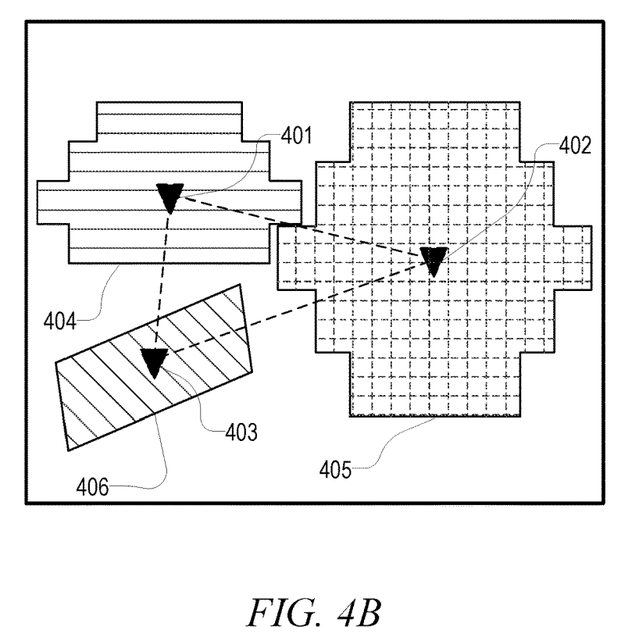
Figure 4C:
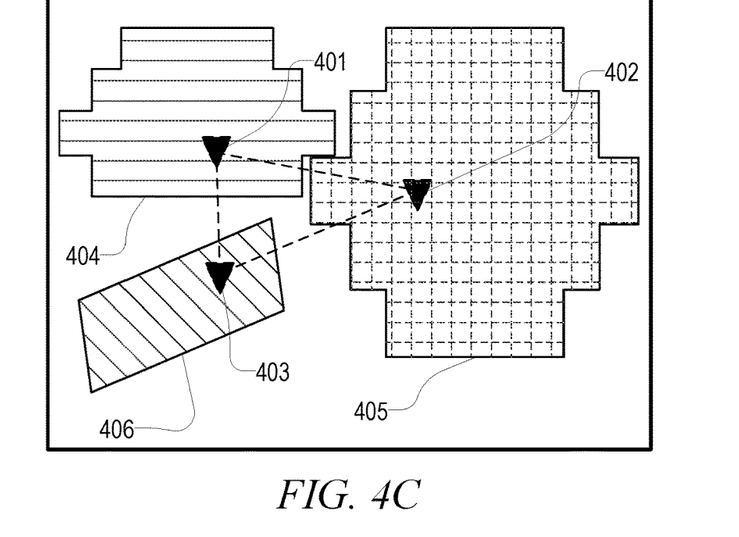
Figure 4D:
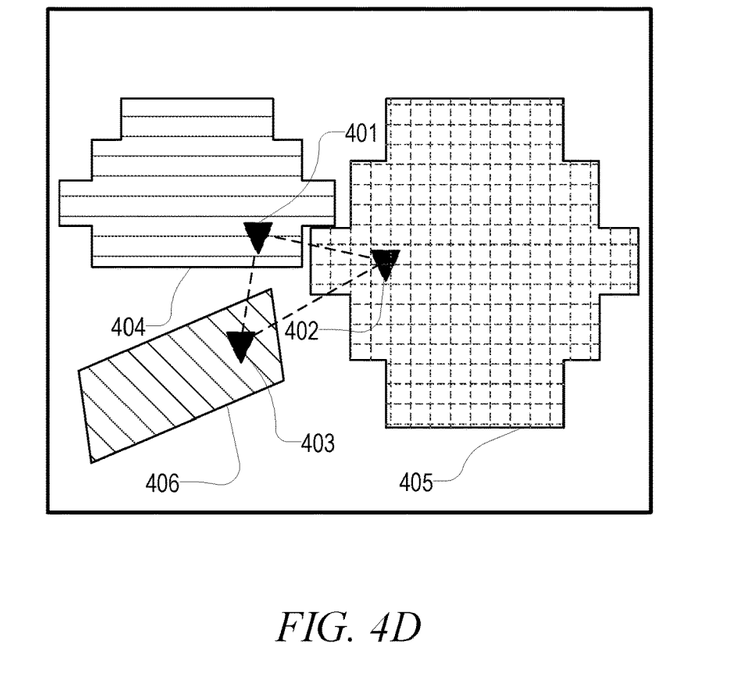

Upon identifying the clustering regions 404-406 associated with the clock drivers 401-403, the CTS tool determines representative locations for the clock drivers 401-403 within their respective clustering regions. In doing so, the CTS tool may construct a graph of nearest neighbors (e.g., at operation 305), an example of which is illustrated in FIG. 4B. Further, as shown in FIGS. 4C and 4D, the CTS tool iteratively moves the clock drivers 401-403 within their respective clustering regions in a manner that minimizes the total edge length of the graph of nearest neighbors for the set of clock drivers 401-403. In minimizing the total edge length, the CTS tool may employ one of many known placement algorithms such as quadratic placement or optimal-region based detailed placement.

Figure 4E:
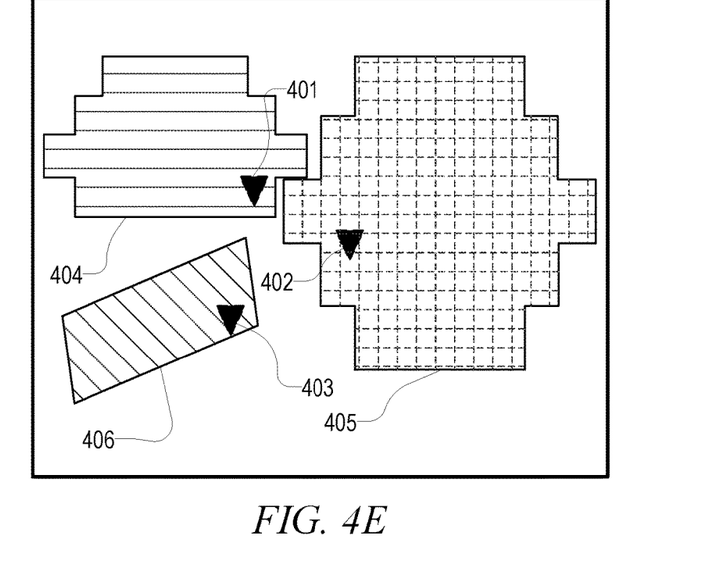
Figure 4F:
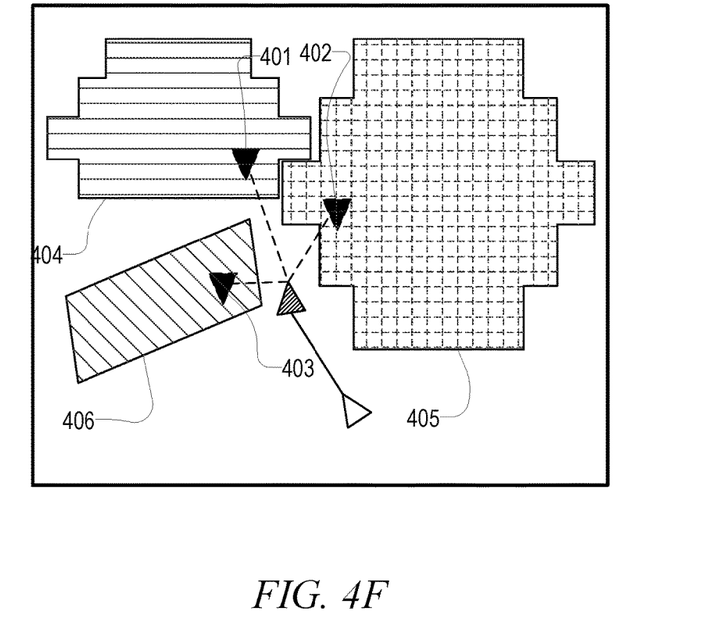

The clock drivers 401-403 are shown in FIG. 4E at determined representative locations within respective clustering regions resulting from the iterative moving. Upon determining the representative locations, the CTS tool performs point-based clustering on the clock drivers 401-403, a result of which is shown in FIG. 4F.

Figure 5:
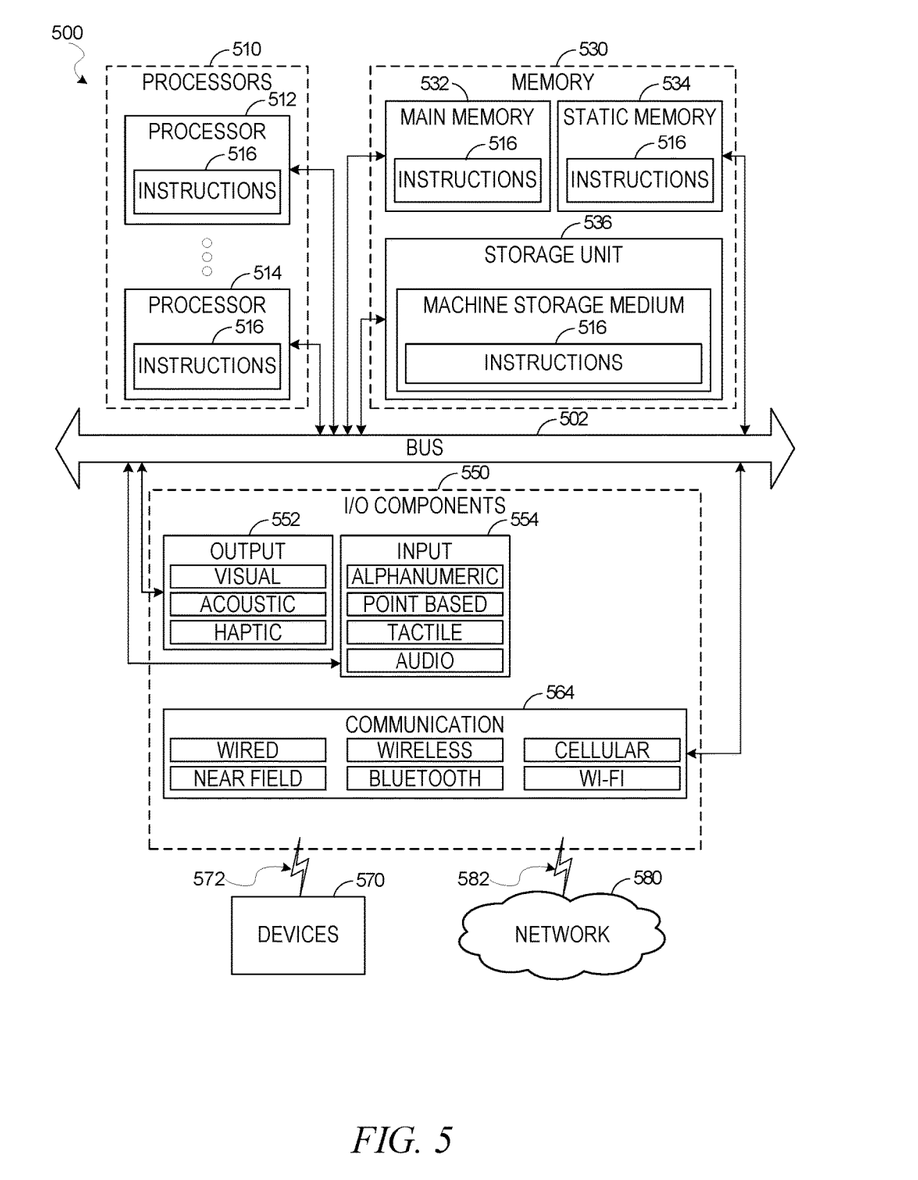
FIG. 5 is a diagrammatic representation of a machine, in the example form of a computer system, within which a set of instructions for causing the machine to perform any one or more of the methodologies discussed herein may be stored and executed.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute the method 200. Additionally, or alternatively, the instructions 516 may implement the design flow 100 of FIG. 1. The instructions 516 transform the general, non-programmed machine 500 into a particular machine 500, such as a routing engine programmed to carry out the described and illustrated functions in the manner described here. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors 510 that may comprise two or more independent processors (sometimes referred to as "cores") that may execute instructions contemporaneously. Although FIG. 5 shows multiple processors, the machine 500 may include a single processor with a single core, a single processor with multiple cores (e.g., a multi-core processor), multiple processors with a single core, multiple processors with multiple cores, or any combination thereof.

The memory 530 may include a main memory 532, a static memory 534, and a storage unit 536, both accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 550 may include communication components 564 operable to couple the machine 500 to a network 580 or devices 550 via a coupling 582 and a coupling 572, respectively. For example, the communication components 564 may include a network interface component or another suitable device to interface with the network 580. In further examples, the communication components 564 may include wired communication components, wireless communication components, cellular communication components, and other communication components to provide communication via other modalities. The devices 570 may be another machine or any of a wide variety of peripheral devices (e.g., a peripheral device coupled via a universal serial bus (USB)).

Executable Instructions and Machine Storage Medium

The various memories (e.g., 530, 532, 534, and/or memory of the processor(s) 510) and/or the storage unit 536 may store one or more sets of instructions and data structures (e.g., software) embodying or utilized by any one or more of the methodologies or functions described herein. These instructions, when executed by the processor(s) 510, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., hypertext transfer protocol (HTTP)). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   one or more processors of a machine; and
   a computer storage medium storing instructions, which when executed by the one or more processors, configure the machine to perform operations comprising:
      identifying a clustering region for a clock driver, from among a set of clock drivers of an integrated circuit design, within a layout of an integrated circuit;
      determining a representative location for the clock driver within the clustering region by finding an arrangement of the set of clock drivers that minimizes edge length in a graph of nearest neighbors corresponding to the set of clock drivers; and
      performing point-based clustering for the set of clock drivers based on the representative location of the clock driver.

2. The system of claim 1, wherein the identifying of the clustering region for the clock driver comprises at least one of:
   identifying locations of one or more sinks or other clock drivers being driven by the clock driver;
   identifying one or more blockages in the IC design; or
   determining one or more timing constraints of the IC design.

3. The system of claim 1, wherein the determining of the representative location for the clock driver comprises:
   constructing the graph of the nearest neighbors corresponding to the set of clock drivers, the graph of the nearest neighbors including a plurality of nodes, each node corresponding to a clock driver from the set of clock drivers, the graph of nearest neighbors further including a plurality of edges, each edge connecting a pair of nodes that represent clock drivers that are nearest neighbor clock drivers.

4. The system of claim 3, wherein the determining of the representative locations for the clock driver further comprises:
   finding the arrangement for the set of clock drivers that minimizes total edge length in the graph of nearest neighbors, the arrangement for the set of clock drivers including the representative locations of the clock driver.

5. The system of claim 4, wherein the finding of the arrangement comprises iteratively moving the set of clock drivers within respective clustering regions.

6. The system of claim 3, wherein the determining of the representative locations for the clock driver further comprises:

iteratively moving the set of clock drivers within respective clustering regions to determine a plurality of clock driver arrangements;
reconstructing the graph of nearest neighbors for each clock driver arrangement of the plurality of clock driver arrangements;
determining a total edge length for each clock driver arrangement based on the graph of nearest neighbors for each clock driver arrangement; and
identifying the clock driver arrangement having the shortest edge length.

7. The system of claim 1, wherein the performing of the point-based clustering comprises:
defining a proximity metric based on representative locations for each clock driver in the set of the clock drivers; and
recursively grouping the clock drivers such that a distance between representative locations of any two clock drivers is below a threshold set by the proximity metric.

8. A method comprising:
identifying, using one or more hardware processors, a clustering region for a clock driver, from among a set of clock drivers of an integrated circuit design stored in memory, within a layout of the integrated circuit;
determining, using the one or more hardware processors, a representative location for the clock driver within the clustering region by finding an arrangement of the set of clock drivers that minimizes edge length in a graph of nearest neighbors corresponding to the set of clock drivers; and
performing, using the one or more hardware processors, point-based clustering for the set of clock drivers based on the representative location of the clock driver.

9. The method of claim 8, wherein the identifying of the clustering region for the clock driver comprises at least one of:
identifying locations of one or more sinks or other clock drivers being driven by the clock driver;
identifying one or more blockages in the IC design; or
determining one or more timing constraints of the IC design.

10. The method of claim 8, wherein the determining of the representative location for the clock driver comprises:
constructing the graph of nearest neighbors for the set of clock drivers, the graph of nearest neighbors including a plurality of nodes, each node corresponding to a clock driver from the set of clock drivers, the graph of nearest neighbors further including a plurality of edges, each edge connecting a pair of nodes that represent clock drivers that are nearest neighbor clock drivers.

11. The method of claim 10, wherein the determining of the representative locations for the clock driver further comprises:
finding, through iterative movement of the set of clock drivers, the arrangement for the set of clock drivers that minimizes total edge length in the graph of nearest neighbors, the arrangement for the set of clock drivers including the representative locations of the clock driver.

12. The method of claim 8, wherein the determining of the representative locations for the clock driver comprises:
iteratively moving the set of clock drivers to find the arrangement for the clock drivers that minimizes the edge length in the graph of nearest neighbors, the arrangement for the set of clock drivers including the representative locations for the clock driver.

13. The method of claim 10, wherein the determining of the representative locations for the clock driver further comprises:
iteratively moving the set of clock drivers within respective clustering regions to determine a plurality of clock driver arrangements;
reconstructing the graph of nearest neighbors for each clock driver arrangement of the plurality of clock driver arrangements;
determining a total edge length for each clock driver arrangement based on the graph of nearest neighbors for each clock driver arrangement; and
identifying the clock driver arrangement having the shortest edge length.

14. The method of claim 8, wherein the performing of the point-based clustering comprises:
defining a proximity metric based on representative locations for each clock driver in the set of the clock drivers; and
recursively grouping the clock drivers such that a distance between representative locations of any two clock drivers is below a threshold set by the proximity metric.

15. A system comprising:
one or more processors of a machine; and
a computer storage medium storing instructions, which when executed by the one or more processors, configure the machine to perform operations comprising:
defining clustering regions for a set of clock drivers of an integrated circuit design;
constructing a graph of nearest neighbors based on the set of clock drivers;
based on the graph of nearest neighbors, determining an arrangement of the set of clock drivers that minimizes a total edge length in the graph of nearest neighbors, the arrangement of the set of clock drivers including a representative location for each clock driver within a respective clustering region; and
clustering the set of clock drivers based on the representative location of the clock driver.

16. The system of claim 15, wherein the defining of the clustering regions for the set of clock drivers comprises at least one of:
identifying locations of one or more sinks or other clock drivers being driven by a first clock driver, a first clustering region corresponding to the first clock driver being defined such that the clustering region encompasses the one or more sinks or the other clock drivers;
identifying one or more blockages in the IC design, a second clustering region corresponding to a second clock driver being defined to avoid the one or more blockages; or
determining one or more timing constraints of the IC design, a third clustering region corresponding to a third clock driver being defined such that the one or more timing constraints are satisfied.

17. The system of claim 15, wherein the determining of the arrangement of the set of clock drivers comprises:
constructing the graph of the nearest neighbors for the set of clock drivers based on an initial location for each of the set of clock drivers, the graph of nearest neighbors including a plurality of nodes, each node corresponding to a clock driver from the set of clock drivers, the graph of nearest neighbors further including a plurality of edges, each edge connecting a pair of nodes that represent clock drivers that are nearest neighbor clock drivers.

18. The system of claim 17, wherein the determining of the arrangement of the set of clock drivers comprises:

finding the arrangement for the set of clock drivers that minimizes total edge length in the graph of nearest neighbors, the arrangement for the set of clock drivers including the representative locations of the clock driver.

19. The system of claim 17, wherein the finding the arrangement for the set of clock drivers that minimizes total edge length comprises:

iteratively moving the set of clock drivers from respective initial location to respective representative locations.

20. The system of claim 15, wherein clustering of the set of clock drivers includes applying a point-based clustering algorithm to the set of clock drivers.

\* \* \* \* \*